United States Patent

Mercer et al.

[15] 3,639,214

[45] Feb. 1, 1972

[54] PRODUCTION OF 6-DEMETHYLTETRACYCLINE

[72] Inventors: Clive Kenneth Mercer; George Desmond Wilkin, both of Nottingham, England

[73] Assignee: The Upjohn Company, Kalamazoo, Mich.

[22] Filed: June 4, 1964

[21] Appl. No.: 372,696

[52] U.S. Cl. .................................................................. 195/80
[51] Int. Cl. ............................................................. C12d 9/18
[58] Field of Search ................................................... 195/80

[56] References Cited

UNITED STATES PATENTS 2,878,289  3/1959  McCormick et al. .............. 195/80 X
3,070,514  12/1962  Virgilio et al. ........................ 195/80
3,092,556  6/1963  Growich et al. ...................... 195/80

*Primary Examiner*—Joseph M. Golian
*Attorney*—Eugene O. Retter

[57] ABSTRACT

This invention relates in an improved method for manufacturing antibiotics of the tetracycline group by growing a microorganism of the class consisting of Streptomyces aureofaciens NCIB 9501, Streptromyces aureofaciens NC1B9502, and mutants and variants thereof aerobically in an aqueous fermentation medium containing a source of carbon and nitrogen and mineral salts, and recovering the antibiotic from the medium.

1 Claims, No Drawings

PRODUCTION OF 6-DEMETHYLTETRACYCLINE

The compounds of the tetracycline group are very valuable broad-spectrum antibiotics, the most important members being tetracycline, chlortetracycline, oxytetracycline and 6-demethylchlortetracycline. Although tetracycline is the parent compound of the group, chlortetracycline was the first one to be isolated from fermentation brews of *Streptomyces aureofaciens*, followed by oxytetracycline. Tetracycline was first prepared on the large scale by catalytic hydrogenation of chlortetracycline although there is usually a small proportion of tetracycline in chlortetracycline brews.

Following the initial isolation of tetracycline there have been described numerous processes for the preparation of tetracycline by fermentation whereby a tetracycline and chlortetracycline producing organism is grown in an aqueous nutrient medium which is chloride-reduced and the main product of the fermentation is tetracycline. British Pat. Specification No. 775,115 claims a process for the preparation of tetracycline by a chlortetracycline producing organism in a medium in which the chloride ions have been reduced, possibly by ion-exchange. British Pat. Specification No. 790,953 claims a process for preparing tetracycline by fermentation in a medium where the chloride ions have been reduced by dialysis. British Pat. Specification No. 773,453 claims a process in which a chloride-free fermentation medium is produced by precipitation of chloride ions with silver nitrate. British Pat. Specification No. 823,230 claims a process in which the tetracycline/chlortetracycline ratio in the fermentation product is increased by adding to a chloride containing medium from 10 to 500 parts per million of bromide ion. British Pat. Specification No. 846,510 and British Pat. Specification No. 845,715 claim processes for the fermentation of tetracycline in which the nutrient media contain chlorination inhibitors.

These fermentation processes are costly in the preparation of chloride free media or inefficient in that so much chlorination inhibitor is required that the tetracycline production by the organism's enzymes is appreciably reduced.

It is an object of the present invention to provide an improved process for the fermentation of nonchlorinated tetracyclines in a chloride-containing medium. It is a specific object of the present invention to prepare tetracycline substantially free from chlortetracycline by fermentation in a chloride-containing medium. It is a further specific object of the present invention to prepare demethyltetracycline substantially free from demethylchlortetracycline in a chloride-containing medium.

We have now discovered that by suitable mutation and selection of *Streptomyces aureofaciens* we can produce a strain of the organism *Streptomyces aureofacients* TH.188, which when grown in a chloride-containing medium will produce tetracycline in high yield, substantially free of chlortetracycline. We have also discovered that this strain of *Streptomyces aureofaciens* TH.188 and similar nonchlorinating organisms may be further mutated to give new strains, which when grown in a chloride containing medium will produce substantially pure 6-demethyltetracycline. The preferred isolate is *Streptomyces aureofaciens* TK.232/2 for the preparation of 6-demethyltetracycline.

According to the present invention there is provided a process for preparing tetracycline antibiotics of the general formula:

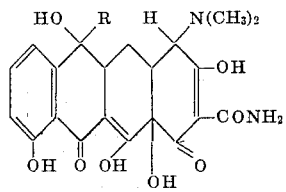

wherein R is hydrogen or methyl, which comprises growing *Streptomyces aureofaciens* TH.188, TK.232/2 and mutants thereof aerobically in an aqueous fermentation medium containing a source of carbon, nitrogen and mineral salts which need not be chloride-free or contain a chloride inhibitor.

The organism from which were derived the new mutants used in the processes according to the present invention was a normal chlortetracycline-producing strain of *Streptomyces aureofaciens* deposited at the culture collection of the North Regional Research Laboratories, Peoria, Ill. United States of America, under the number NRRL. B1286. The organism was mutated by irradiation with ultraviolet light until only about 0.1 percent of the organisms were viable.

After irradiation the remaining organisms were plated out and individual isolates were grown aerobically in shake flasks containing a normal chloride-containing medium suitable for the preparation of chlortetracycline. The harvest brews were chromatographed and organisms were selected for their reduced ability to produce chlortetracycline. After a series of such mutations and selections we selected *Streptomyces aureofaciens* TH.188 which gave a high yield of tetracycline and substantially no chlortetracycline.

Using similar techniques of irradiation *Streptomyces aureofaciens* TH.47, a low-chlorinating organism obtained by irradiation of NRRL. B1286 in the same way as the organism TH.188, was mutated and the viable mutants were selected for their ability to produce demethyltetracycline. After mutation and selection, an organism, *Streptomyces aureofaciens* TK.232/2 was discovered which produced demethyltetracycline in fair yield, substantially free from tetracycline and chlorine-containing tetracyclines.

*Streptomyces* TH.188 and *Streptomyces* TK.232/2 have been deposited at the National Collection of Industrial Bacteria, Torry, Kincardineshire, Scotland, under the accession numbers NCIB 9501 and NCIB 9502 respectively. The organisms will be referred to under their NCIB accession numbers subsequently in this specification.

The mutated organisms have been selected by paper chromatography of fermentation brews. Shake flask brews are harvested, the brew is extracted at PH2 with butanol and applied to a Whatman No. 1 paper previously dipped in a 0.1 molar aqueous solution of ethylenediamine tetraacetic acid and dried.

The paper is developed with the organic phase of a mixture of butanol (4 parts), ammonium hydroxide S.G. 0.88 (1 part), and water (5 parts) for 18 hours and the position of the antibiotic is shown by irradiation of the dried paper with U.V. light.

For the separation of demethyltetracycline-containing brews, a similar chromatographic technique was employed but the solvent employed was a mixture of chloroform (9 parts), butanol (1 part), saturated with aqueous 0.3 M. phosphoric acid containing 0.1 percent of trichloroacetic acid.

Typical Rf values in this system are:

| | |
|---|---|
| Chlortetracycline | 0.78 |
| 6-Demethyltetracycline | 0.71 |
| Tetracycline | 0.57 |
| 6-Demethyltetracycline | 0.40 |
| Oxytetracycline | 0.13 |

The mutants were selected using this system and the organisms NCIB 9501 and NCIB 9502 did not show the presence of chlorinated tetracyclines. An accurate assay of tetracyclines is not possible by this method and isolated solids from fermentations by the new mutants were assayed by quantitative biochromatogram.

Whole harvest brew is acidified with hydrochloric acid to pH 2 and is extracted with four-fifths volume of n-butanol. A single extraction of this nature gives an 80 percent extraction of the active material in the brew and the concentration in the butanol extract is therefore equivalent to the concentration in the initial brew. Whatman No. 1 paper strips are soaked in 0.3 M $NaH_2PO_4 \cdot 2H_2O$ solution adjusted to pH 3 with phosphoric acid and are then dried. The butanol extract (0.002 ml.) is applied to the top of the strip and the chromatogram is developed for 9 hours by the descending solvent phase using as solvent butanol saturated with 0.3 M $NaH_2PO_4 \cdot 2H_2O$ solution at pH 3. Tetracycline and chlortetracycline standard preparations are run concurrently. A standard curve of chlortetracycline is prepared by chromatography of pure, chlortetracycline free, tetracycline to which has been added known amounts of pure chlortetracycline. The chromatograms are placed on bioplates seeded with *Bacillus cereus* and incubated overnight. The zones of inhibition produced by chlortetracycline are measured and form the basis for a standard curve such as is normally used in biological assay. Using this method roughly 0.1 percent of chlortetracycline has been demonstrated in the brews according to the present invention.

The solids isolated from fermentation brews of mutant NCIB 9502 contain similar negligible amounts of chlorine-containing tetracyclines. Furthermore, neither of these organisms NCIB 9501 and NCIB 9502 produce bromotetracyclines when grown in a medium containing bromide ions.

The mutant NCIB 9501 is characterized according to Bergey (7th Edition) as a strain of *Streptomyces aureofaciens* by the following criteria:

1. It is a mesophilic saprophyte.
2. It produces a soluble golden yellow pigment on some organic media.
3. Growth is orange in cinnamon with grey aerial mycelium.
4. It produces a yellowish pigment on synthetic media.
5. It produces a tetracycline.

The mutants NCIB 9501 and NCIB 9502 are grown initially on a conventional agar slant. A suitable composition is:

| | |
|---|---|
| Asparagine | 0.05% |
| Beef extract | 0.2% |
| $K_2HPO_4$ | 0.05% |
| Glucose | 1.0% |
| Agar | 1.7% |
| Tapwater to | 100% |
| pH to 6.8 before sterilizing | |

The slants prepared from such a medium are inoculated with a spore suspension and incubated at 26° C. for 14 days.

The growth from the agar slant is used to inoculate a standard primary seed medium according to conventional antibiotic manufacturing technique. We find that a medium of the following constitution gives good growth of the organism.

| | |
|---|---|
| Corn steep liquor | 3.2% v/v |
| Sucrose | 0.3% |
| Chalk | 0.5% |
| Tapwater to | 100% |
| pH 5.8–6.0 before sterilization | |

Fifty milliliters of such a medium is sterilized in a 250 ml. conical flask and inoculated with about $200 \times 10^6$ spores from an agar slant. Incubation is continued for 26 hours at 26° C. on a shaker with a speed of 250 r.p.m. and a throw of 2 inches. The vegetative inoculum produced is then used to seed the main fermentation medium at a concentration of 5 percent or a secondary seed using the same primary seed medium.

The main fermentation stage is conveniently performed in a medium which is suitable for the preparation of chlortetracycline and other tetracycline antibiotics but there is no necessity to reduce the chloride content of the medium nor to inhibit the use of chlorine by the organism by addition of bromide ions, sulphonamides or by other chloride ion inhibitors. Suitable media include those with the following compositions:

Medium A

| | |
|---|---|
| Corn steep liquor | 2.5–3.5% v/v |
| Chalk | 0.7–1.2% w/v |
| Starch | 3.0% |
| Sucrose | 3.5% |
| Ammonium sulfate | 0.6% |
| Ammonium chloride | 0.3% |
| Manganous sulfate | 0.0005–0.1% |
| Lard Oil | 1.6% |
| Tapwater to | 100% |
| pH before sterilizing 5.8–6.2 | |

Medium B

Similar to medium A but also including Pharmamedia 0.6 percent a commercially available protein hydrolysate.

Medium C

| | |
|---|---|
| Glucose | 2% |
| Soya flour | 1% |
| Corn steep liquor | 1% |
| Sodium chloride | 0.5% |
| Calcium carbonate | 0.5% |
| Tapwater to | 100% |
| pH before sterilizing 6.6–6.8 | |

We have found that Media A and B give particularly good yields of tetracycline and that it is very important that manganese should be present.

Absence of manganese from the medium reduces the tetracycline titre of an otherwise typical fermentation to below 30 percent of the normal value. The preferred Medium D is one of type B containing 2.5 percent v/v corn steep liquor, 1.0 percent chalk and 0.01 percent manganous sulphate.

Fermentation conditions are similar to those customarily used in the growth of *Streptomyces aureofaciens*. The aerobic fermentation is maintained at about 26° C. for 6–7 days with additions of an antifoaming agent if required. Suitable antifoam agents are cetyl alcohol and triethanolamine stearate which may conveniently be added in solution in lard oil.

When the fermentation has reached its peak yield of antibiotic, the brew is harvested and the antibiotic isolated by known methods.

The invention is illustrated by the following nonlimitative examples.

EXAMPLE 1

An 8 l. stirred fermenter containing sterile Medium D (4 l.) was inoculated with a 200 ml. portion of a secondary seed vegetative inoculum of *Streptomyces aureofaciens* NCIB 9501. Fermentation at 26° C. was continued with a stirrer speed of 700 r.p.m. for 6 days. During fermentation sterile air was introduced at a rate of 8 liters/minute. The brew was adjusted to pH to 2.5 with hydrochloric acid, diluted with 2 volumes of water, the mycelium was filtered off, washed with acid water, filtered, and the filtrates were combined. There was isolated from the combined filtrates 3.95 g. of tetracycline, assaying 1020 g/g by bioassay and containing only 0.13 percent chlortetracycline (quantitative biochromatogram).

EXAMPLE 2

A shake flask containing 40 ml. of Medium D was inoculated with 1.3 ml. of a primary seed vegetative of *Streptomyces aureofaciens* NCIB 9502, and was fermented for 6 days at 26° C. at a shaker speed of 250 r.p.m. with a throw of 2 inches. The fermentation brew from a number of such shake flasks was combined and a bulked acid filtrate obtained as in example 1.

From the bulked filtrate there was isolated 6-demethylchlortetracycline which was free of tetracycline and 6-demethylchlortetracycline when tested by paper chromatography.

EXAMPLE 3

An 8 litre stirred fermenter containing sterile medium D (4 l.) was inoculated with 160 ml. of a 24-hour secondary seed vegetative inoculum of *Streptomyces aureofaciens* NCIB 9502 and was fermented at 26° C. for 6 days with a stirrer speed of 700 r.p.m. Sterile air was introduced at a rate of 4.5 l./min. Whole brew from these fermentations (10 l.) was acidified to pH 1.5 with concentrated hydrochloric acid, kieselguhr was added, the mixture was filtered and the mycelium was washed with water (2×2 l.). The combined filtrates were adjusted to pH 8.8 with sodium hydroxide, 80 percent Sequestrol $Na^4$ (15 ml.) was added and the filtrate was extracted with butanol (2 l.). The aqueous liquor was reextracted twice with butanol (1 l.). the extracts were combined and were extracted with dilute sulphuric acid at pH 1.5 (4×300 ml.). The combined acid extracts were concentrated in vacuo to 200 ml., sodium hydroxide was added to pH 5 and the solution was left to stand overnight. The crystals of crude antibiotic which separated were collected by filtration, washed with water and dried in vacuo.

The crude base was dissolved in cold methanol at the rate of 40 ml./g., was filtered through Kieselguhr and concentrated to small volume. Addition of a few drops of water produced flesh colored crystals which were collected by filtration and dried to give 6-demethyltetracycline dihydrate m.p. 175°–180° C. (d), $[\alpha]_D$ −270° (1 percent in N/10 HCl). (Found: C, 53.8; H, 5.7% $C_{21}H_{22}NO_8 \cdot 2H_2O$ requires C, 54.1; H, 5.6 percent).

The recrystallized base 2.5 g.) was dissolved in cold methanol (100 ml.) and neutralized with concentrated hydrochloric acid (0.65 ml.) The solution was filtered through Norit SX Plus charcoal (1 g.) which had been previously washed with methanolic HCl and the pale yellow filtrate was concentrated in vacuo to a small volume. Replacement distillation with acetone gave dull yellow crystals of 6-demethyltetracycline hydrochlorine sesquihydrate, decomposed at about 210° C. $[\alpha]_D$ −259° (1 percent N/10 HCl). (Found: C, 51.2; H, 5.3% $C_{21}H_{23}ClN_2O_8$, 1½ $H_2O$ requires C, 51.1; 5.3 percent).

The crude base (0.5 g.) was suspended in ethanol (10 ml.) and toluene-p-sulphonic acid monohydrate (0.4 g.) was added. A clear solution was obtained from which beige colored plate crystals rapidly separated. These were collected by filtration, washed with ethanol and recrystallized by dissolving in methanol (20 ml.) containing toluene-p-sulphonic acid (0.1 g.), filtering through charcoal which had been acid-washed and diluting the filtrate with ether. The pale yellow needles which crystallized were collected to give 6-demethyltetracycline toluene-p-sulphonate m.p. 230° C. (d) $[\alpha]_D$ −213° (1% N/10 HCl). (Found: C, 55.9; H, 5.1% $C_{28}H_{20}N_2O_{11}S$ requires C, 55.8 H, 5.0 percent).

When subjected to thin layer chromatography on a silica gel covered plate which had been prerun with methanol containing 10 percent v/v concentrated hydrochloric acid to remove iron, the chromatogram being developed by the same solvent, the free base, hydrochloride and toluene-p-sulphonate all give a single spot.

We claim:

1. The process of producing 6-demethyltetracycline which comprises growing a micro-organism selected from the class consisting of *Streptomyces aureofaciens* NCIB 9502 and nonchlorinating 6-demethyltetracycline producing mutants and variants thereof under submerged aerobic conditions in an aqueous fermentation medium containing a source of carbon and nitrogen and mineral salts, and recovering 6-demethyltetracycline from the medium.

* * * * *